Dec. 15, 1964     L. S. BARTLEY     3,161,087
WIRE STRIPPING TOOL
Filed July 10, 1962

INVENTOR
LEO S. BARTLEY

BY *Russell, Chittick & Pfund*

ATTORNEYS

United States Patent Office 3,161,087
Patented Dec. 15, 1964

3,161,087
WIRE STRIPPING TOOL
Leo S. Bartley, Rome, N.Y., assignor to Bartley Manufacturing Company, Incorporated, Rome, N.Y., a corporation of New York
Filed July 10, 1962, Ser. No. 208,722
6 Claims. (Cl. 81—9.5)

This invention relates generally to a wire stripper and more particularly to an improved wire stripping tool generally similar to that disclosed and claimed in applicant's copending application, Ser. No. 62,702, filed October 14, 1960, now Patent No. 3,108,505.

As described in applicant's copending application, a novel wire stripping tool is provided which is adapted to engage an insulated wire in the axial direction of the wire to cut and strip the insulation on the wire. A feature of applicant's improved wire stripping tool is the independence of the operations of gripping the insulated wire for holding the wire securely during the stripping operation and the application of the cutting force with the subsequent application of the stripping motion. This sequence of operations is completely controllable with applicant's tool and permits the operator to exercise the necessary degree of care and control throughout the stripping operation. At the same time the tool of the present invention provides improved features for a stripping tool of this type which improve the operation with respect to the wire to be stripped, and at the same time provides a tool which is mechanically rugged and reliable in use and economically manufactured.

Accordingly, the primary object of the present invention is to provide an axially operated wire stripping tool of improved construction and performance.

These and other objects of the invention will become apparent from the following detailed description taken in conjunction with the accompanying drawings wherein.

Figure 1:
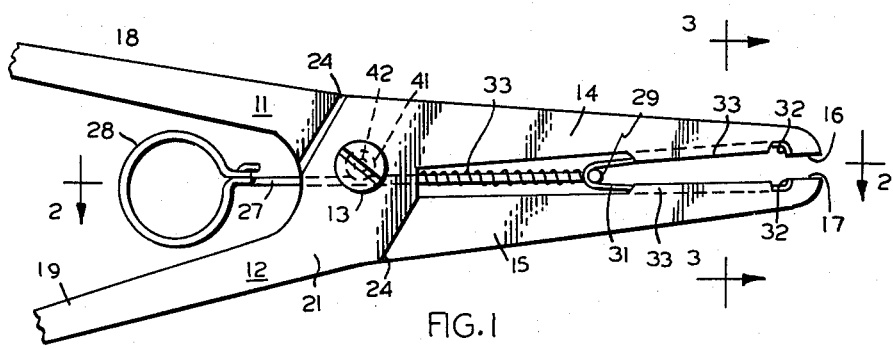
FIG. 1 is a fragmentary plan view of an improved wire stripping tool in accordance with the invention.

Referring now to the various figures of the drawings, the construction of the wire stripping tool of the present invention will be described. The tool provides a configuration generally similar to a radio-type pliers. This structure includes a pair of plier-type members 11, 12 which fit together to provide a pliers-type pivot 13. On one side of the pivot 13, jaw extensions 14, 15 extend and terminate in gripping jaws 16, 17. On the opposite side of the pivot 13, the members 11 and 12 are formed into gripping handles 18, 19.

Figure 5:
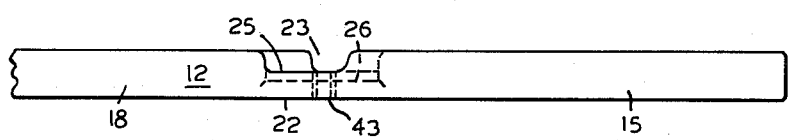
FIG. 5 is an edge elevation of the member shown in FIG. 4.
Figure 6:
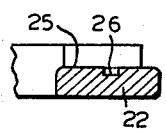
FIG. 6 is a sectional view on the line 6—6 of FIG. 4.

The member 12 has a relatively massive portion 21 of considerable width connecting the jaw extension 14 with the handle 19. This massive cross piece 21 fits into a relatively close fitting mating recess formed by a corresponding cross piece 22 between the jaw extension 15 and the handle 18. This recess which is designated 23 in FIG. 5 provides only relatively slight clearances 24 for the cross connection 21 and thus limits the full open position of the gripping jaws 14 and 15 to approximately the position shown in FIG. 1. The two pieces 11 and 12 thus are fit together in somewhat similar manner to a loose fitting mortise and tenon joint.

The lower cross connection 22 has a thickness greater than half the overall thickness of the tool with the result that the recess 23 has a depth less than half the thickness of the tool members. This can be seen in FIG. 5 where the recess 23 has a bottom wall 25 which is not located at the mid-plane of the thickness dimension of the part 12. The corresponding dimensions of the part 11, which are not illustrated herein, are the opposite of that for part 12, i.e., the thickness of the cross extension 21 corresponds to the depth of the recess 23 and similarly the corresponding recess associated with the cross extension 21 has a depth corresponding to the thickness of the cross extension 22. The purpose of this asymmetrical construction in the region of the pivot 13 is to provide for the formation of a slot 26 in the cross extension 22. The slot 26 extends across the extension 22 and generally coincides with the center line axis of the tool. When the tool is assembled, as shown in FIG. 1, the slot 26 has a rod 27 passing therethrough which has affixed to one end thereof a finger ring 28 and at the other end has a projection 29 formed by a right angle bend of the rod 27.

The rod 27 extends through a hole in the base of a U-shaped spring 31, the opposite ends of which are bent to form opposed cutting and stripping jaws 32. Mounted on the rod 27 between the cross extensions 21 and 22 and the end having the projection 29 thereon is a compression spring 33 which maintains a normal position for the U-spring 31 with the cutting and stripping jaws 32 adjacent the inside edges of the gripping jaws 16 and 17.

Figure 2:
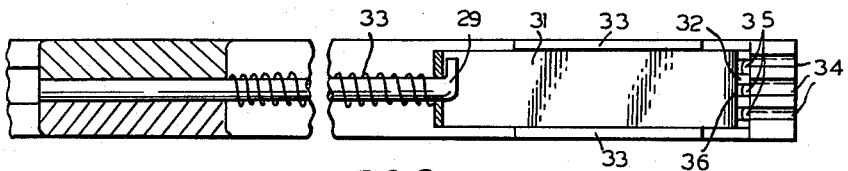
FIG. 2 is a sectional view on the line 2—2 of FIG. 1.
Figure 3:
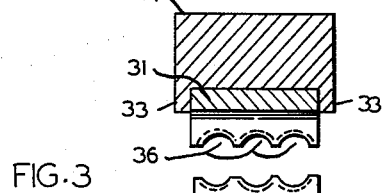
FIG. 3 is an enlarged sectional view on the line 3—3 of FIG. 1.
Figure 4:
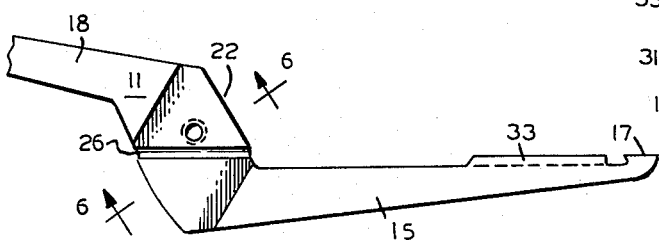
FIG. 4 is a plan view of the lower pivoted member shown in FIG. 1 for the purpose of disclosing details of construction.

As best seen in FIG. 3, the inner surfaces of the jaw extensions 14 and 15 are formed with side walls 33 which produce a channel shaped opening in which the two arms of the spring 31 can slide. This arrangement can also be seen in FIG. 2 where the U-spring 31 is shown between the side wall extensions 33 which form the channel opening. Also shown in FIG. 2 is a series of semi-cylindrical grooves 34 which are formed in the gripping jaw 16 and 17 to accommodate with a firm grip various wire sizes corresponding to the diameter of the insulation thereon. Axially aligned with these grooves 34 are a series of semi-circular holes 35 in the cutting and stripping jaws 32 which may be drilled and countersunk to provide sharp semi-circular cutting edges 36.

The U-spring 31 is confined in the channels formed by the walls 33 and by the limited full open position of the jaws 14, 15 which is less than the full expanded width of the U-spring 31. The only other connection to the U-spring 31 is that provided by the projection 29. The U-spring can thus be readily replaced if it becomes dull or damaged during use. Furthermore, the U-spring 31 is relatively stiff in the lateral direction, and hence its position in the channels on the jaws 14, 15 helps keep them aligned.

The pivot connection 13 is made by means of a flat-head screw having a cylindrical shoulder 41 which extends for the thickness of the cross connection 21 and threaded at 42 for threaded engagement with a threaded hole 43 in the cross connection 22. The cross connection 21 is drilled to a size to accommodate a cylindrical shoulder 41 on the screw and thus maintain the two pieces 11 and 12 in alignment when the screw is threaded into engagement with the threaded hole 43.

The operation of the tool of the present invention will now be described. The gripping jaws 16 and 17 are normally spread by the spring action of the U-spring 31. The tool is held by handles 18, 19 to accommodate a piece of wire which is to be stripped in a relative arrangement where the wire end projects between the gripping jaws 16, 17, extends beyond the cutting and stripping jaws 32 by the amount to be stripped, and is substantially aligned with the rod 27. The spring 31 tends to hold the jaw extensions 14 and 15 in the open position, as previously mentioned, thereby facilitating the initial engagement with the wire to be stripped as well as automatically spreading both the gripping and stripping jaws on the return stroke after the stripping operation is completed. One of the grooves 34 is selected corresponding to the wire size which is being stripped and the wire is aligned in the particular groove 34 selected. The wire extends in the groove a distance corresponding to that length of the wire which is to be stripped with the stripping cut being made at the position of the cutting jaws 32 when they are adjacent the inside edges of the gripping jaws 16 and 17. With the wire thus positioned, the handles 18 and 19 are closed by a gentle squeezing action of the hand sufficient to grip firmly the insulated wire in the grooves 34. A slight additional pressure may be applied to compress slightly the somewhat elastic insulation on the wire and at the same time by the action of the jaws 14 and 15 against the U-shaped spring 31, the cutting edges 32 are caused to close an amount which permits the semi-circular cutting edges 36 to close through the insulation of the wire but not far enough to nick the wire conductor that is coaxially centered within the insulation. From this position, a finger previously inserted in the finger ring 28 is used to withdraw the assembly comprising the ring 28, rod 27 and the U-shaped spring 31 to separate the cutting and stripping jaw 32 from the gripping jaws 16 and 17 in the axial direction. This movement is completely independent of the pressure applied by the gripping jaws 16 and 17, and therefore can be manipulated with care and the operation observed and controlled throughout the stripping stroke.

At the end of the stripping stroke, a release of the handles 18 and 19 simultaneously with releasing the finger ring 28 permits the U-shaped spring 31 to slide and expand jaw extensions 14 and 15 so that the returning cutting jaws 32 do not slide along the stripped conductor or disarrange the individual conductors where multiple strand wire is being stripped. The stripping operation is accordingly completed expeditiously with full control by the operator of all the steps involved and with a tool which is handy for access in cramped locations or in engaging individual conductors of a multi-conductor cable.

Obviously many changes may be made in the invention without departing from the scope of the present teaching, and accordingly the invention is not to be considered as limited to the precise embodiment shown but only by the scope of the appended claims.

I claim:
1. A wire stripper comprising a pliers having a pair of pivoted members with extensions on one side of said pivot terminating in opposed longitudinally grooved gripping jaws, opposed channels on the inner surfaces of said extensions, a flat spring strip member formed in a U-shape and positioned to slide in said channels with the open end of said U-shape strip adjacent said gripping jaws, notched cutting edges formed on said open end of said strip in alignment with said grooved gripping jaws, and means attached to the bend in said U-shaped strip for slidably retracting said U-shape strip independently of the position of said gripping jaws.

2. A wire stripping pliers having a pivot connection for two mating members, said members forming handles and extensions with gripping jaws substantially symmetrically arranged relative to a stripping axis which coincides with the longitudinal axis of the wire to be stripped, one of said members having a slot aligned with said axis and extending across said one member in the region of said pivot connection, said pivot connection being on one side of said axis, cutting and stripping means located between said gripping jaws and slidable along said axis, and an actuator rod connected at one end to said cutting and stripping means and extending through said slot.

3. Apparatus according to claim 2 in which said cutting and stripping means comprises cutting and stripping jaws adjacent said gripping jaws with spring means for normally maintaining said cutting and stripping jaws open and adapted to be closed by the closure of said gripping jaws.

4. Apparatus according to claim 3 in which said cutting and stripping jaws are formed at the ends of a U-shaped spring strip, and including opposed channels on the inner surfaces of said extensions in which said U-shaped spring is constrained to slide, the normal shape of said U-shaped spring urging said gripping jaws to an open position.

5. A wire stripping pliers comprising a pair of mated members pivotally connected with jaw extensions on one side of the pivot connection terminating in opposed gripping jaws, opposed channels along the inner surfaces of said extensions positioned intermediate said jaws and said pivot connection, a U-shaped spring strip having the ends thereof formed into opposed cutting edges, means slidably urging said U-shaped spring to slide in said channels to a position where said cutting edges abut said gripping jaws, means for limiting the pivotal action of said members to a full open position in which said U-shaped spring is still confined in said channels and urges said gripping jaws to said full open position, a rod connected at one end to the bottom of said U-shaped spring and slidably extending through the region of said pivot connection, and means for slidably retracting said rod independently of the pivotal position of said members.

6. Apparatus according to claim 5 in which said opposed jaws are formed with mating semi-cylindrical grooves approximately aligned with said rod, and said cutting edges are formed with mating recesses registering with said grooves and corresponding in size to the wire size to be stripped.

References Cited in the file of this patent
UNITED STATES PATENTS

| | | |
|---|---|---|
| 1,151,319 | Wood | Aug. 24, 1915 |
| 1,857,731 | Lund | May 10, 1932 |
| 2,268,282 | Gary | Dec. 30, 1941 |
| 2,542,249 | Higgins | Feb. 20, 1951 |
| 2,697,956 | Cook | Dec. 28, 1954 |
| 2,735,320 | Green | Feb. 21, 1956 |
| 2,995,051 | Redway | Aug. 8, 1961 |
| 3,005,366 | Grimshaw et al. | Oct. 24, 1961 |
| 3,087,363 | Jacobs | Apr. 30, 1963 |